United States Patent [19]
Okada et al.

[11] Patent Number: 5,657,761
[45] Date of Patent: Aug. 19, 1997

[54] ULTRASONIC DIAGNOSIS SYSTEM

[75] Inventors: Kazutaka Okada, Iwatsuki; Tsuyoshi Mitake, Noda; Akira Sasaki, Ichikawa; Hiroshi Kanda, Tokorozawa, all of Japan

[73] Assignee: Hitachi Medical Corporation, Tokyo, Japan

[21] Appl. No.: 400,844

[22] Filed: Mar. 8, 1995

[30] Foreign Application Priority Data

Apr. 22, 1994 [JP] Japan ..................................... 6-084980

[51] Int. Cl.$^6$ ....................................................... A61B 8/00
[52] U.S. Cl. ....................................................... 128/660.01
[58] Field of Search .................... 128/660.01, 660.07, 128/661.01, 662.03; 73/632

[56]         References Cited

U.S. PATENT DOCUMENTS

| | | | |
|---|---|---|---|
| 4,774,568 | 9/1988 | Matsuo | 358/98 |
| 4,811,740 | 3/1989 | Ikeda et al. | 128/660.01 |
| 4,868,476 | 9/1989 | Respaut | 318/632 |
| 4,893,284 | 1/1990 | Magrane | 367/12 |
| 5,081,993 | 1/1992 | Kitney et al. | 128/661.08 |
| 5,205,175 | 4/1993 | Garza et al. | 73/628 |
| 5,251,631 | 10/1993 | Tsuchiko et al. | 128/661.01 |
| 5,318,027 | 6/1994 | Fukui | 128/660.01 |

*Primary Examiner*—Francis Jaworski
*Attorney, Agent, or Firm*—Antonelli, Terry, Stout & Kraus, LLP

[57]             ABSTRACT

An ultrasonic diagnosis system includes a probe and a diagnosis processing apparatus. Ultrasonic transmission signal-transmission power characteristic intrinsic to the probe is previously measured and a transmission power identifying signal indicating the characteristic is imparted to the probe itself. Upon connection of the probe to the diagnosis processing apparatus, the transmission power identifying signal is inputted to a CPU of the diagnosis processing apparatus which includes a memory for storing correcting data corresponding to ranks of the characteristics. The CPU reads out from the memory the correcting data on the basis of the inputted transmission power identifying signal indicating the rank of the probe for thereby correcting the ultrasonic transmission signal. When the characteristic of the probe as connected is such that greater transmission power is outputted for the basic transmission signal when compared with the standardized or design level, amplitude of the ultrasonic transmission signal is corrected to be smaller so that the transmission power assumes the standard or design value. The power sent from the probe thus coincides with the design value regardless of variance in the characteristic of the probe.

16 Claims, 2 Drawing Sheets

ULTRASONIC DIAGNOSIS SYSTEM

BACKGROUND OF THE INVENTION

1. Field of the Invention

The present invention generally relates to an ultrasonic diagnosis system. More particularly, the invention is concerned with an ultrasonic diagnosis system which incorporates a function for correcting and/or controlling ultrasonic transmission power on the basis of a signal sent from a probe.

2. Description of Related Art

For better understanding of the present invention, description will first be made in some detail of an ultrasonic diagnosis system known heretofore by reference to FIG. 1 of the accompanying drawings which shows in a block diagram a general arrangement of an hitherto known ultrasonic diagnosis system such as an ultrasonic tomography system.

Referring to the figure, the prior art ultrasonic diagnosis system includes a probe 1 which is composed of an array constituted by a large number of vibrational elements or transducers and realized in a multi-channel structure for transmitting and receiving an ultrasonic wave to and from an object undergoing the diagnosis (hereinafter referred to as the object under test) and a diagnosis processing apparatus 100 which is designed to process the ultrasonic echo signal supplied from the probe to thereby generate an image such as a tomogram for display.

In the ultrasonic diagnosis system of the type mentioned above, an ultrasonic transmission power control is usually adopted for the purpose of protecting the object under test against exposure to excessively large ultrasonic transmission power from the standpoint of safety. To this end, the diagnosis processing apparatus 100 incorporates therein a memory or storage 8 in which voltage values (hereinafter also referred to as the voltage data) for a transmission-dedicated high-voltage power supply D are stored in correspondence to the types of the probes, wherein a CPU (Central Processing Unit) 6 reads out the voltage data from the memory 8 in dependence on a probe type identifying signal A which indicates or identifies the probe 1 as employed to thereby generate a signal E for changing over the voltage of the transmission-dedicated high-voltage power supply D.

To this end, there is provided a power supply driver circuit 5 which references the transmission-dedicated high-voltage power supply control signal E to thereby change correspondingly the voltage of a transmission-dedicated high-voltage power supply D. As a result of this, amplitude of the ultrasonic transmission signal applied to the probe 1 from a transmission circuit 21 is changed correspondingly. In this manner, the ultrasonic transmission power is so controlled that the basic ultrasonic power emitted from the probe 1 is prevented from exceeding a predetermined level which is prerequisite for ensuring safety or security of the object under test.

SUMMARY OF THE INVENTION

As is apparent from the above description, in the ultrasonic diagnosis system known heretofore, the amplitude of the ultrasonic transmission signal supplied to the probe 1 is definitely determined only in dependence on the type of the probe. In this conjunction, it is however noted that even the individual probes belonging to one and the same type may exhibit different or various ultrasonic transmission signal-versus-transmission power characteristics. As a consequence, there may arise such possibility that the ultrasonic transmission power of the individual probes differs from one to another probe even when the probes belongs to a same type or group. In the ultrasonic diagnosis system heretofore known, no consideration is paid to the variances in the ultrasonic transmission signal-versus-transmission power characteristics of the individual probes. To cope with this problem, it may be conceived to lower the ultrasonic transmission power with a some extent of margin by taking into account the variances in the characteristic among the individual probes, which will however result in lowering of the sensitivity, rendering it impossible to make available a maximum or optimal sensitivity, giving rise to another problem. Realization of the maximum sensitivity as well as securing of the safety for the object under test can be achieved by actually measuring the ultrasonic transmission power of the probe as used. In that case, however, lots of time and labor will be involved for the measurement which has to be carried out before the ultrasonic diagnosis system, (i.e., the combination of the diagnosis processing apparatus and the probe attached thereto) is actually put into operation for diagnosis.

In the light of the state of the art, it is an object of the present invention to provide an ultrasonic diagnosis system which can enjoy a maximum sensitivity while ensuring enhanced safety or security and which can profitably be employed for practical diagnosis applications.

In view of the above and other objects which will become apparent as the description proceeds, there is provided according to an aspect of the present invention an ultrasonic diagnosis system which includes a probe and a diagnosis processing apparatus, wherein ultrasonic transmission signal-versus-transmission power characteristic inherent to a probe is previously measured and a transmission power identifying signal indicating the characteristic is imparted to the probe itself. Upon connection of the probe to the diagnosis processing apparatus, the transmission power identifying signal is inputted to a CPU (Central Processing Unit) of the diagnosis processing apparatus. Impartment of the transmission power identifying signal to the probe may be realized by incorporating in the probe a memory for storing the transmission power identifying signal or a circuit for generating this signal. Alternatively, the transmission power identifying signal may be given in terms of the structure of a connector used for connecting the probe to the diagnosis processing apparatus, e.g. number of connector pins or an array thereof, from which the CPU of the diagnosis processing apparatus can read the transmission power inherent to the probe. In a preferred mode for carrying out the present invention, there may previously be prepared a plurality of ranks for the ultrasonic transmission signal-versus-transmission power characteristic, and it is determined in advance to which rank a given probe belongs. In that case, the transmission power identifying signal indicates the rank inherent to the probe.

On the other hand, the probe supplies a signal specifying the type of probe to the diagnosis processing apparatus as in the case of the hitherto known ultrasonic diagnosis system. The CPU of the diagnosis processing apparatus controls the ultrasonic transmission signal so that the basic transmission power determined previously in accordance with the type of the probe is sent out from the probe.

In another preferred mode for carrying out the present invention, a memory may be incorporated in the diagnosis processing apparatus for storing correcting data in correspondence to the ranks of the aforementioned characteristics. The CPU reads out the correcting data from the memory on the basis of the inputted transmission power identifying signal indicating the rank to which the probe as connected belongs to thereby correct correspondingly the ultrasonic transmission signal. By way of example, when the aforementioned characteristic inherent to the probe is such that a greater transmission power is outputted for the basic transmission signal when compared with the standard or designed characteristics, the ultrasonic transmission signal is so corrected that the transmission power assumes the standard or designed level, e.g. by decreasing the amplitude of the ultrasonic transmission signal. In this manner, the power emitted from the probe is always so controlled as to coincide substantially with the design value regardless of variance in the aforementioned characteristic of the probe.

These and other objects as well as attendant advantages of the present invention will be readily apparent from the following description of the preferred exemplary embodiments of the invention taken in conjunction with the accompanying drawings.

BRIEF DESCRIPTION OF THE DRAWINGS

In the course of the description which follows, reference is made to the drawings, in which.

DESCRIPTION OF THE PREFERRED EMBODIMENTS

Now, the present invention will be described in detail in conjunction with preferred or exemplary embodiments thereof by reference to the drawings.

Figure 1:
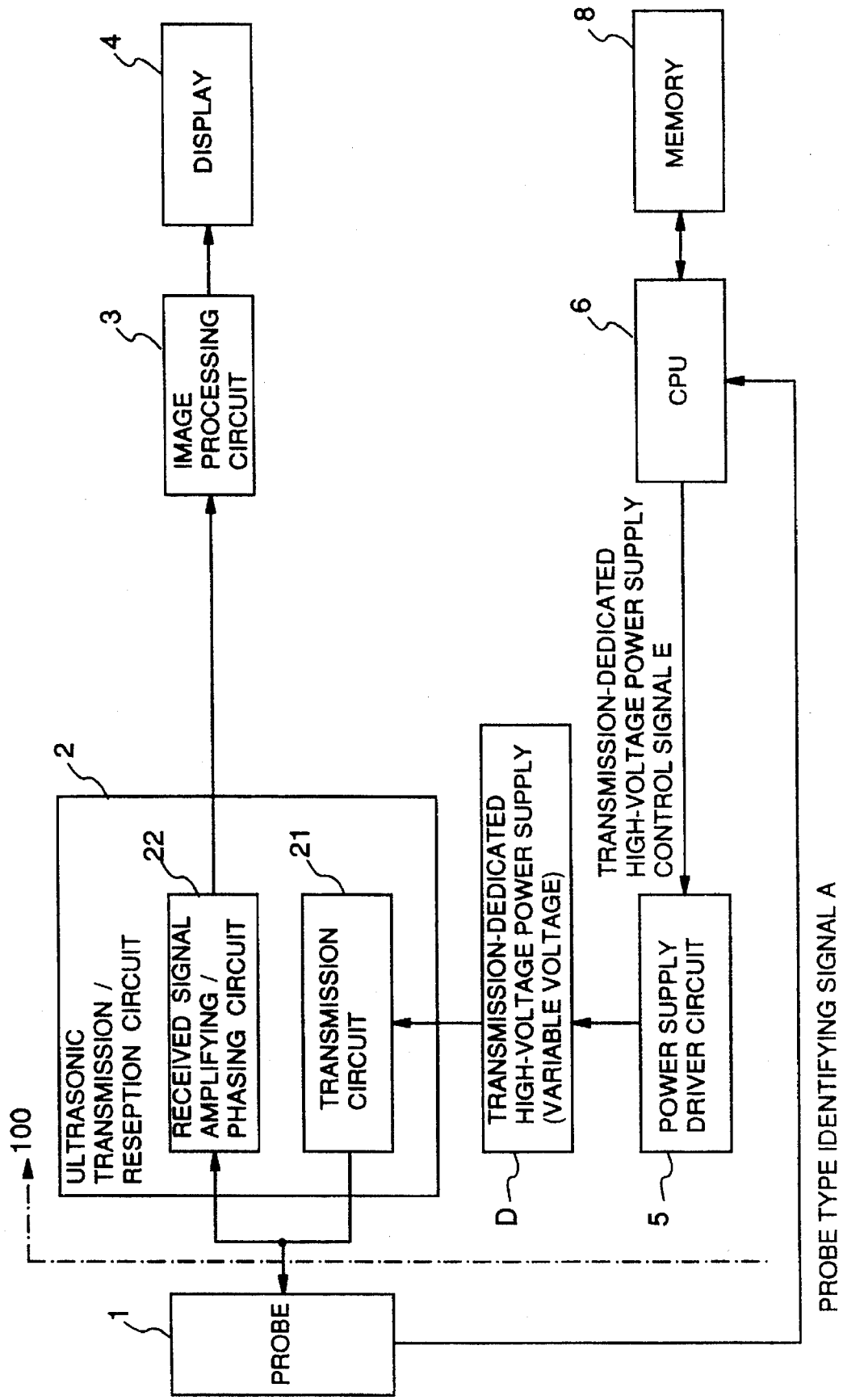
FIG. 1 is a block diagram showing a general arrangement of a conventional ultrasonic diagnosis system.
Figure 2:
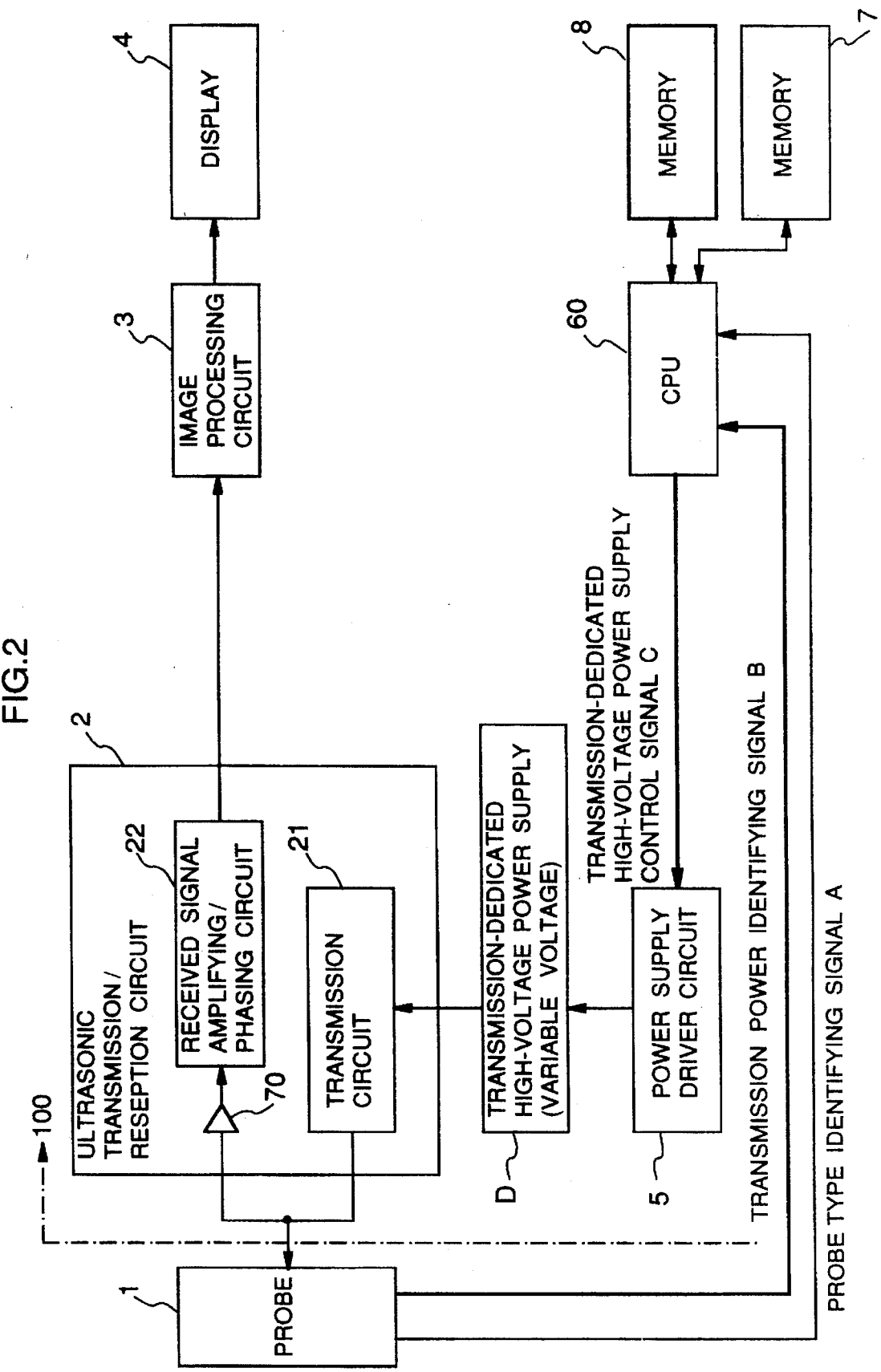
FIG. 2 is a block diagram showing in general an arrangement of the ultrasonic diagnosis system according to an exemplary embodiment of the present invention.

FIG. 2 shows generally a configuration of an ultrasonic diagnosis system exemplified by an ultrasonic tomography system according to an embodiment of the present invention. The ultrasonic diagnosis system according to the invention is comprised of a probe 1 constituted by an array of numerous vibrational elements or transducers in a multi-channel structure for transmitting and receiving ultrasonic wave to and from an object under test and a diagnosis processing apparatus 100. Parenthetically, the ultrasonic diagnosis system shown in FIG. 2, same or like components as those shown in FIG. 1 are denoted by like reference characters. In this conjunction, it should further be mentioned that the probe and the diagnosis processing apparatus known heretofore are commercially available, for example, from Hitachi Medical Corporation of Japan under the model identifiers "EUB-565A" or "EUB-555" and "EUP-F334", respectively.

As can be seen in FIG. 2, the diagnosis processing apparatus 100 is composed of an ultrasonic transmission/reception circuit 2 which serves for both functions, i.e., the function for supplying an ultrasonic transmission signal to the probe 1 and the function for amplifying an ultrasonic reception signal supplied from the probe 1 and phasing the ultrasonic reception signal while imparting a delay to the signal which is required for realizing the focusing, a image processing circuit 3 for performing a signal processing on the output signal from the ultrasonic transmission/reception circuit 2 to thereby generate a picture or video signal, and a display unit 4 for displaying a picture such as a tomogram on the basis of the video signal outputted from the image processing circuit 3.

On the other hand, the ultrasonic transmission/reception circuit 2 mentioned above is constituted by a transmission circuit 21 for generating an ultrasonic transmission signal which is supplied to the probe 1 for driving thereof, and a received signal phasing circuit 22 for amplifying an ultrasonic echo signal received by the probe 1 from the object under test, imparting a delay required for the focusing and combining additively the individual channel signals. The image processing circuit 3 serves for signal processings such as logarithmic compression and detection as well as conversion of the output signal from the received signal phasing circuit 22 to a picture or video signal such as a television signal or the like which is supplied to the display unit 4.

The components mentioned above are placed under the control of a CPU (Central Processing Unit) 60. Further, the CPU 60 receives a probe type identifying signal A from the probe 1 to identify the type of the probe 1. As the probe type identifying signal A, there may be used a signal indicating or identifying discriminatively the types of the probe such as a linear probe, a convex probe, a sector probe or the like as well as structural factors of the probe such as radius of curvature or the like.

In the system according to the invention, the ultrasonic transmission signal-versus-transmission power characteristics of the probe 1 is actually measured upon manufacturing of the probe or before shipping thereof (i.e., before being put into operation for practical application), whereon a transmission power identifying signal B indicating one of plural ranks determined previously to which the ultrasonic transmission power of the probe as measured belongs is imparted to the probe. In this connection, it is to be noted that there are stored in a memory 7 data for correcting the transmission power of the probe in one-to-one correspondence relations to the above-mentioned plural ranks, respectively.

In operation, the CPU 60 responds to the transmission power identifying signal B by reading out the corresponding transmission power correcting data from the memory 7 and corrects a transmission-dedicated high-voltage power supply control signal E (see FIG. 1) corresponding to a basic transmission power as specified on the basis of the probe type identifying signal A to thereby generate a transmission-dedicated high-voltage power supply control signal C.

The power supply driver circuit 5 responds to the transmission-dedicated high-voltage power supply control signal C to change correspondingly the voltage of a transmission-dedicated high-voltage power supply D. Thus, the amplitude of the ultrasonic transmission signal supplied to the probe 1 from the transmission circuit 21 is changed correspondingly. In this manner, the ultrasonic transmission power can be controlled so as to be suited for the probe as used.

In actuality, the transmission-dedicated high-voltage power supply control signal C represents the signal which is corrected also in view of the voltage data which is read out from the memory 8 in accordance with the probe type identifying signal A supplied from the probe 1. Thus, it can be said that in the ultrasonic diagnosis system according to the invention, the ultrasonic transmission power control is also performed in accordance with the probe type identifying signal A which is supplied from the probe 1, as in the case of the system known heretofore.

Impartment of the transmission power identifying signal B to the probe 1 may be realized in terms of a structure of a connector (not shown) used for connecting the probe 1 to the diagnosis processing apparatus 100. Alternatively, a memory of small capacity may be incorporated in the probe 1 for storing the transmission power identifying signal B. Of course, any other suitable measures may be adopted to this end.

As is apparent from the above description, the ultrasonic transmission power is automatically corrected for thereby compensating for variance in the ultrasonic transmission signal-versus-transmission power characteristic of the probe, whereby a maximum sensitivity can be realized while ensuring safety for the object under test. Besides, variance in the sensitivity which is ascribable to the probe itself can be mitigated. Besides, because the ultrasonic transmission powers of the individual probes are actually measured en bloc upon manufacturing or shipping thereof, there is no necessity of measuring the ultrasonic transmission power of the probe in the field when the ultrasonic diagnosis system is put into operation for actual application.

Although the control of the ultrasonic transmission power is effectuated by changing the amplitude of the ultrasonic transmission signal supplied to the probe 1 from the transmission circuit 21 in the case of the illustrated embodiment, the present invention is never restricted to such type of control. Byway of example, the frequency of the ultrasonic transmission signal may be changed essentially to the same effects. In brief, it is sufficient that the intended control of the ultrasonic transmission power can be realized by resorting to any appropriate technique.

Further, in the case of the illustrated embodiment, the means for changing the amplitude of the ultrasonic transmission signal is realized by adopting the arrangement for changing the voltage of the transmission-dedicated high-voltage power supply D. It should however be noted that the invention is never restricted to such method but any other techniques for changing the amplitude of the ultrasonic transmission signal may be adopted, inclusive of a method for maintaining constant the voltage of the transmission-dedicated high-voltage power supply D, as occasion permits.

Additionally, although the signal indicating the relevant rank of the probe 1 is used as the transmission power identifying signal B, it is equally possible to use a plurality of parameters which are so determined previously that the ultrasonic transmission power can arithmetically be determined in accordance with an arithmetic formula stored in place of the transmission power correcting data. In that case, the CPU 60 is so programmed as to generate the transmission-dedicated high-voltage power supply control signal C which corresponds to the transmission power identifying signal B given in terms of the parameter in accordance with the arithmetic formula.

As a further modification of the illustrated embodiment, a signal identifying the reception sensitivity of the probe may be used in place of the transmission power identifying signal B for changing the gain of the reception amplifier 70 constituting a part of the ultrasonic transmission/reception circuit 2 to thereby effectuate the automatic correction of the reception sensitivity of the probe.

More specifically, the ultrasonic reception sensitivity of the probe 1 is actually measured upon manufacture or shipping thereof, whereon a reception sensitivity identifying signal indicating one of predetermined plural ranks to which the probe belongs is imparted to the probe.

The CPU 60 responds to the reception sensitivity identifying signal by changing the gain of the reception amplifier 70 of the ultrasonic transmission/reception circuit 2 to thereby effectuate the automatic correction of the reception sensitivity of the probe.

In this manner, the maximum sensitivity can be ensured for the ultrasonic diagnosis system while securing safety for the object under test, to a great advantage from the practical viewpoint. In this case, parameters may be used in place of the ranks, as mentioned previously. In that case, an arithmetic formula or formulae for determining the reception sensitivity of the probe is stored in the memory 7.

As will now be understood from the foregoing description, difference in the ultrasonic transmission power or reception sensitivity among the individual probes due to variance in the characteristics thereof can positively and accurately be compensated for according to the teachings of the present invention, whereby a maximum sensitivity of the ultrasonic diagnosis system can be obtained while securing safety for the object under test.

The present invention is additionally attended with advantage that the measurement of the ultrasonic transmission power and/or reception sensitivity of the probe as used actually is rendered unnecessary in the field, which is of course beneficent to the practical use of the ultrasonic diagnosis system.

We claim:

1. An ultrasonic diagnosis system, comprising:
    a probe having a number of arrayed vibrational elements and implemented in a multi-channel configuration for transmitting and receiving an ultrasonic wave to and from an object under test, said probe having information concerning an ultrasonic transmission signal-versus-transmission power characteristic which is selected from a plurality of different ranks for ultrasonic transmission signal-versus-transmission power characteristics on the basis of an ultrasonic transmission power actually measured in advance for said probe, said information being outputted as an ultrasonic transmission power identifying signal; and
    a diagnosis processing apparatus, wherein said diagnosis processing apparatus includes:
        an ultrasonic transmission/reception circuit for supplying an ultrasonic transmission signal to said probe and receiving an ultrasonic reception signal from said probe for amplifying and phasing said ultrasonic reception signal while imparting a predetermined delay to said signal;
        an image processing circuit for performing a predetermined processing on an output signal from said ultrasonic transmission/reception circuit to thereby generate a video signal;
        a display unit for generating an image on the basis of the video signal supplied from image processing circuit to display said image;
        specifying means for specifying transmission power correcting data on the basis of said ultrasonic transmission power identifying signal supplied to said diagnosis processing apparatus upon connection of said probe to said diagnosis processing apparatus; and
        ultrasonic transmission power correcting means for generating a transmission-dedicated high-voltage power supply control signal on the basis of said transmission power correcting data to thereby correct said ultrasonic transmission power by changing correspondingly the ultrasonic transmission signal supplied to said probe from said ultrasonic transmission/reception circuit.

2. An ultrasonic diagnosis system according to claim 1, wherein said correcting data specifying means includes:
    a memory for storing the transmission power correcting data in correspondence to said plural ranks, respectively; and read means for reading from said memory the transmission power correcting data corresponding to the rank imparted to said probe on the basis of said identification signal.

3. An ultrasonic diagnosis system according to claim 1, wherein said identifying signal represents a parameter, said correcting data specifying means includes:

a memory storing a predetermined arithmetic formula; and arithmetic means for determining arithmetically said correcting data by fitting said parameter to said arithmetic formula.

4. An ultrasonic diagnosis system according to claim 1, wherein said probe further comprises means for outputting a probe type identifying signal for identifying the type of said probe, and said diagnosis processing apparatus further includes:

means for specifying the ultrasonic transmission signal corresponding to a basic transmission power on the basis of said probe type identifying signal supplied to said diagnosis processing apparatus upon connection of said probe to said diagnosis processing apparatus, wherein said correcting means changes said ultrasonic transmission signal on the basis of said correcting data.

5. An ultrasonic diagnosis system according to claim 4, wherein said image displayed on said display unit is a tomogram of an object under test.

6. A probe for an ultrasonic diagnosis system, comprising:

an array of vibrational elements for transmitting and receiving an ultrasonic wave to and from an object under test;

first means for outputting information concerning an ultrasonic transmission signal-versus-transmission power characteristic which is selected from a plurality of different ranks for the ultrasonic transmission signal-versus-transmission power characteristics on the basis of an ultrasonic transmission power actually measured in advance for said probe; and second means for outputting a type identifying signal which identifies type of said probe.

7. A diagnosis processing apparatus to which a probe is detachably connected, wherein said probe comprises an array of vibrational elements for transmitting and receiving an ultrasonic wave to and from an object under test, first means for outputting information concerning an ultrasonic transmission signal-versus-transmission power characteristic which is selected from a plurality of different ranks for the ultrasonic transmission signal-versus-transmission power characteristics on the basis of an ultrasonic transmission power actually measured in advance for said probe as an ultrasonic transmission power identifying signal, and second means for outputting a type identifying signal which identifies type of said probe, comprising:

an ultrasonic transmission/reception circuit for supplying an ultrasonic transmission signal to said probe and receiving an ultrasonic reception signal from said probe for thereby amplifying and phasing said ultrasonic reception signal while imparting a predetermined delay thereto;

an image processing circuit for performing a predetermined processing on an output signal from said ultrasonic transmission/reception circuit to thereby generate a video signal;

a display unit for generating an image on the basis of the video signal supplied from said image processing circuit to display said image;

means for specifying the ultrasonic transmission signal which corresponds to a basic transmission power of said probe on the basis of said type identifying signal supplied to said diagnosis processing apparatus upon connection of said probe to said diagnosis processing apparatus;

means for specifying transmission power correcting data on the basis of said transmission power identifying signal supplied to said diagnosis processing apparatus upon connection of said probe to said diagnosis processing apparatus; and ultrasonic transmission power correcting means for generating a transmission-dedicated high-voltage power supply control signal on the basis of said transmission power correcting data to thereby correct said ultrasonic transmission power by changing correspondingly the ultrasonic transmission signal supplied to said probe from said ultrasonic transmission/reception circuit.

8. An ultrasonic diagnosis system, comprising:

a probe including a first means for outputting a first signal which specifies a type of said probe and a second means for outputting a second signal which specifies an ultrasonic transmission signal-versus-transmission power characteristic inherent to said probe;

a diagnosis processing apparatus to which said probe is detachably connected, said diagnosis processing apparatus processing an ultrasonic signal supplied thereto from said probe for thereby generating an image;

means for applying an ultrasonic transmission signal to said probe which responds thereto by emitting an ultrasonic wave of a transmission power corresponding to said ultrasonic transmission signal;

specifying means for specifying said ultrasonic transmission signal which determines a basic transmission power of said probe on the basis of said first signal; and correcting means for correcting said ultrasonic transmission signal on the basis of said second signal so that said transmission power does not exceed a predetermined level; wherein said first and second signals are inputted to said specifying means and said correcting means, respectively, upon connection of said probe to said diagnosis processing apparatus.

9. An ultrasonic diagnosis system according to claim 8, wherein said first and second means are constituted by a memory incorporated in said probe.

10. An ultrasonic diagnosis system according to claim 8, wherein said second means is implemented by a structure of a connector used for connecting said probe to said diagnosis processing apparatus.

11. An ultrasonic diagnosis system, comprising:

a probe having a number of arrayed vibrational elements and implemented in a multi-channel configuration for transmitting and receiving an ultrasonic wave to and from an object under test, said probe having information concerning an ultrasonic transmission signal-versus-transmission power characteristic which is selected from a plurality of different ranks for ultrasonic transmission signal-versus-transmission power characteristics on the basis of an ultrasonic transmission power actually measured in advance for said probe, said information being outputted as a first signal; and a diagnosis processing apparatus, wherein said diagnosis processing apparatus includes:

an ultrasonic transmission/reception circuit for supplying an ultrasonic transmission signal to said probe and receiving an ultrasonic reception signal from said probe for thereby amplifying and phasing said ultrasonic reception signal while imparting a predetermined delay thereto;

an image processing circuit for performing a predetermined processing on an output signal from said ultrasonic transmission/reception circuit to thereby generate a video signal;

a display unit for generating an image on the basis of the video signal supplied from image processing circuit to thereby display said image;

specifying means for specifying correcting data on the basis of said first signal supplied to said diagnosis processing apparatus upon connection of said probe to said diagnosis processing apparatus; and means for correcting a gain of said ultrasonic transmission/reception circuit for said ultrasonic reception signal in accordance with said specified correcting data.

12. An ultrasonic diagnosis system according to claim 11, wherein said correcting data specifying means includes:

a memory for storing the correcting data in correspondence to said plural ranks, respectively; and read means for reading from said memory the correcting data corresponding to the rank imparted to said probe on the basis of said first signal.

13. An ultrasonic diagnosis system according to claim 11, wherein said first signal represents a parameter, said correcting data specifying means includes:

a memory storing a predetermined arithmetic formula; and arithmetic means for determining arithmetically said correcting data by fitting said parameter into said arithmetic formula.

14. An ultrasonic diagnosis system according to claim 11, wherein said probe comprises means for outputting a probe type identifying signal for identifying the type of said probe, and said diagnosis processing apparatus further includes:

means for specifying the ultrasonic transmission signal corresponding to a basic transmission power on the basis of said probe type identifying signal supplied to said diagnosis processing apparatus upon connection of said probe to said diagnosis processing apparatus.

15. An ultrasonic diagnosis system according to claim 8, wherein said second means has a plurality of different ranks, each rank corresponding to an ultrasonic transmission power from said probe, for outputting said second signal indicating a rank inherent to said probe which is selected from said plurality of different ranks on the basis of ultrasonic transmission power actually measured in advance for said probe.

16. An ultrasonic diagnosis system, comprising:

a probe having a number of arrayed vibrational elements and implemented in a multi-channel configuration for transmitting and receiving an ultrasonic wave to and from an object under test, said probe having information concerning an ultrasonic transmission signal-versus-transmission power characteristic which is selected from a plurality of different ranks for ultrasonic transmission signal-versus-transmission power characteristics on the basis of an ultrasonic transmission power actually measured in advance for said probe, said information being outputted as an ultrasonic transmission power identifying signal; and a diagnosis processing apparatus, wherein said diagnosis processing apparatus includes:

an ultrasonic transmission/reception circuit for supplying an ultrasonic transmission signal to said probe and receiving an ultrasonic reception signal from said probe for amplifying and phasing said ultrasonic reception signal while imparting a predetermined delay to said signal; and an image processing circuit for performing a predetermined processing on an output signal from said ultrasonic transmission/reception circuit to thereby generate a video signal.

* * * * *